United States Patent [19]

Choi

[11] Patent Number: 5,239,420
[45] Date of Patent: Aug. 24, 1993

[54] TRIPLE DECK RECORDING AND REPRODUCING SYSTEM

[75] Inventor: Seung L. Choi, Suweon-city, Rep. of Korea

[73] Assignee: SamSung Electronics Co., Ltd., Suwon, Rep. of Korea

[21] Appl. No.: 801,858

[22] Filed: Dec. 3, 1991

[30] Foreign Application Priority Data

Jan. 9, 1991 [KR] Rep. of Korea .......................... 91-224

[51] Int. Cl.⁵ .......................... G11B 5/86; G11B 27/02; H04N 5/262
[52] U.S. Cl. ..................................... 360/15; 360/13; 360/61; 358/183
[58] Field of Search .................... 360/13, 15, 33.1, 61, 360/137, 14.1; 358/183, 181, 310, 335

[56] References Cited

U.S. PATENT DOCUMENTS

| | | | |
|---|---|---|---|
| 4,031,548 | 6/1977 | Kato et al. .......................... | 358/188 |
| 4,577,239 | 3/1986 | Sougen .............................. | 360/15 |
| 4,630,133 | 12/1986 | Long ................................. | 358/335 |
| 4,768,110 | 8/1988 | Dunlap et al. .................... | 360/33.1 |
| 4,890,168 | 12/1989 | Inoue et al. ..................... | 358/183 X |
| 4,949,179 | 8/1990 | Hosono ............................. | 358/183 |

Primary Examiner—Andrew L. Sniezek
Attorney, Agent, or Firm—Robert E. Bushnell

[57] ABSTRACT

A triple deck recording and reproducing system with three video tape decks are integrated, and mounted within a single video tape recorder, when performing recording and reproducing, a main picture is displayed by selecting one among VHS or 8 mm or 4 mm of the video decks and another picture is displayed in the form of a PIP (Picture-In-Picture). Thus, the selected main and auxiliary pictures can be mixed with another deck for dubbing recording, and then, a user can display all the signals reproduced by three decks on the PIP, so as to compare the pictures with each other and display a plurality of the different pictures as a particular effect.

15 Claims, 3 Drawing Sheets

TRIPLE DECK RECORDING AND REPRODUCING SYSTEM

FIELD OF THE INVENTION

The present invention relates to a triple deck recording and reproducing system which is an integrating three decks, two of which being the ½ inch VHS type and a third being an 8 mm or 4 mm type video deck. Therefore two different formats can be simultaneously recorded and reproduced in order to simplify editing with the ½ inch or 8 mm or 4 mm type decks.

BACKGROUND OF THE INVENTION

Generally, VHS format video tapes (tape width 12.65 mm=½ inches) can be used only in VHS format video tape recorders, while 8 mm or 4 mm video tapes can be used only in 8 mm or 4 mm format video tape recorders. Therefore, if a user having a VHS format video tape recorder has only 8 mm video tapes, he must also purchase an 8 mm format video tape recorder. Further, if a program recorded on a VHS tape is to be edited or copied to an 8 mm tape, or if a program recorded on the 8 mm tape is to be edited or copied to the VHS tape, two video tape recorders are required to support both formats.

Accordingly, there is a need for multi-function video tape recorders for copying or editing different formats such as a VHS type or, 8 mm or 4 mm size. Recently, double deck video tape recorders having two video decks of the VHS format or two different formats integrated into a single video tape recorder have been introduced.

However, such double deck video tape recorders of VHS-8 mm recording is performed simultaneously both in the VHS type video deck (½ inch deck) and in the 8 mm of the video deck. Further, the program of a particular channel on air can be recorded by either the VHS type or 8 mm of the decks, and at the same time the program can be reproduced by the other video deck. Further, the program recorded on a VHS tape can be edited and copied to 8 mm of the tape, and inversely, the program of the tape of 8 mm can be also edited and copied to the VHS tape.

SUMMARY OF THE INVENTION

Therefore, it is an object of the present invention to provide a triple deck recording and reproducing system in which two VHS format video decks and an 8 mm or 4 mm format video deck are incorporated into a single video tape recorder. Further, in a triple deck system according to the present invention a main picture can be displayed from among the ½ inch and 8 mm or 4 mm decks along with a sub-picture from a different one of the decks in the form of a PIP (Picture in Picture).

In order to achieve the above object, according to the present invention, the triple deck recording and reproducing system includes a digital tuner for converting and processing RF signals received through an antenna into video signals, a switching device for mutually and organically controlling a first, second and third video decks for recording and reproducing broadcasting signals received through the digital tuner or external signals to a magnetic recording media and having a first switch connected to an output terminal of the first video deck for selectively supplying reproduced signals of the first deck to the second and third video decks, a second switch connected to an output terminal of the second video deck for selectively supplying the reproduced signals from the second video deck to the first and third video decks, a third switch connected to an output terminal of the third video deck for selectively supplying the reproduced signals from the third video deck to the first and second video decks, the first, second and third switches forming the switching device synchronizing signal detecting means for detecting the synchronizing signals in the video signals received from the first, second, and third video decks, a key input provided with a plurality of keys for operating the switching device and the first, the second, and the third video decks, a microprocessor (hereinafter, "MICOM") for generating control signals for controlling the switching device and the video decks according to the signals inputted through the key input and, PIP signal generator means for controlling picture signals displayed on a monitor by inputting synchronizing signals detected during reproduction by the first, the second, and the third video decks.

BRIEF DESCRIPTION OF THE DRAWINGS

The above object and other advantages of the present invention will become more apparent from the description for the preferred embodiment of the present invention with reference to the attached drawings, in which.

DETAILED DESCRIPTION OF THE PREFERRED EMBODIMENT

Figure 1:
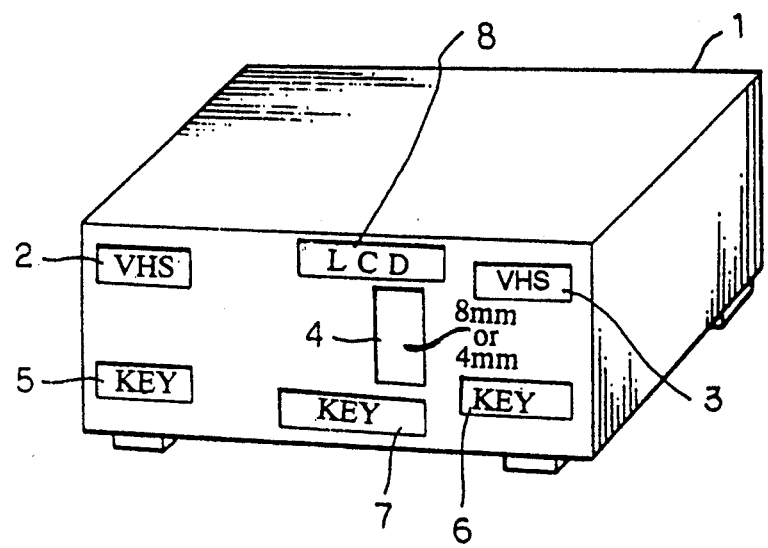
FIG. 1 is a schematical perspective view of a triple deck recording and reproducing system according to the present invention.

FIG. 1 is a schematical perspective view of a triple deck recording and reproducing system according to the present invention. In FIG. 1, the system comprises two video decks 2,3 which load VHS format video tapes ½ inch tape respectively, a video deck 4 which loads either an 8 mm or 4 mm video tape, key panels 5,6 for operating the video decks 2, 3, a key panel 7 for operating the video deck 4, and an LCD display 8 for displaying the operating state of all the video decks 2,3,4.

The key panels can be intensively disposed at one place close to one another and include a simultaneous recording key for editing.

Figure 2:
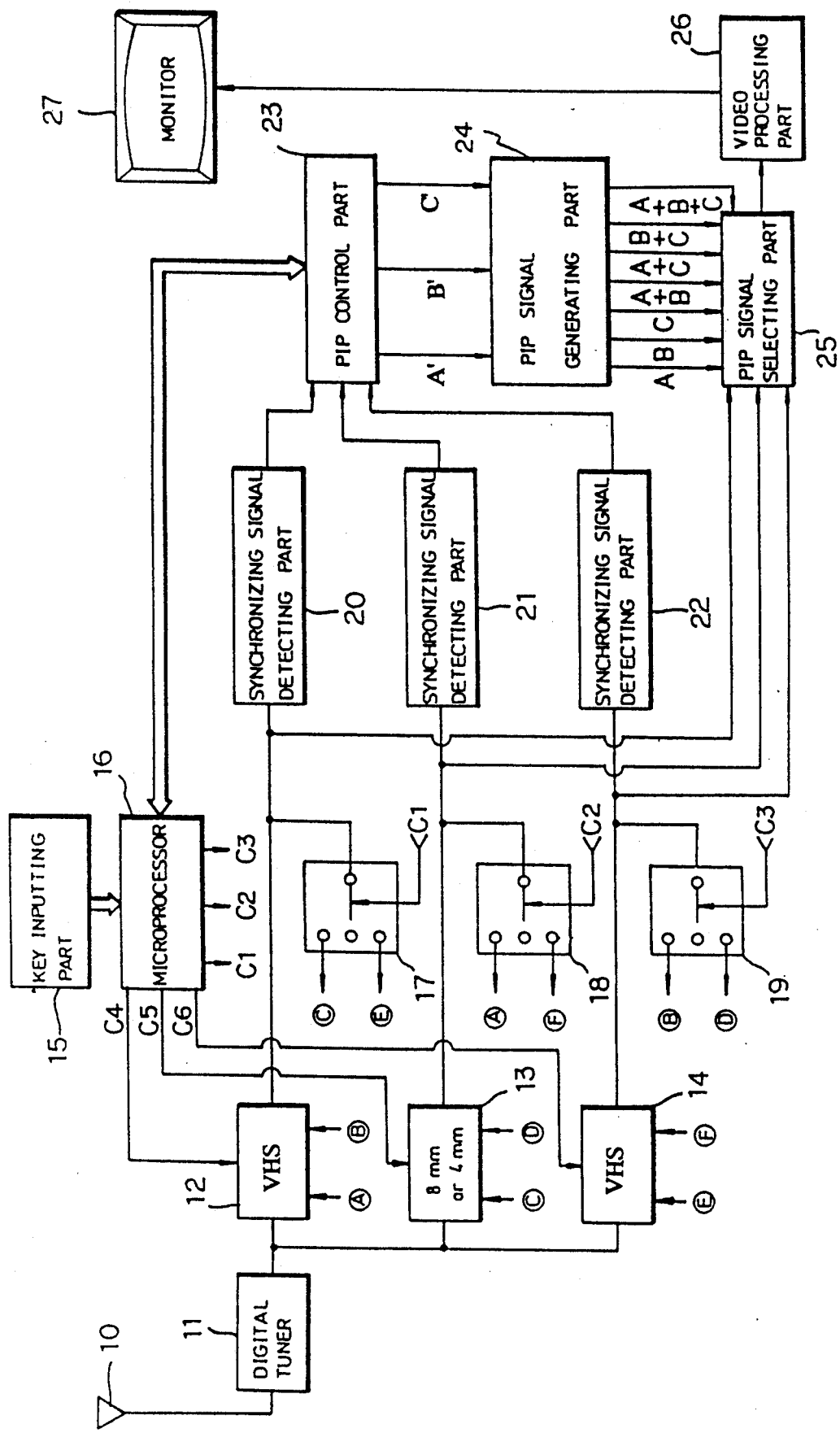
FIG. 2 is a block diagram showing the triple video tape recorder reproducing system in FIG. 1.

FIG. 2 illustrates the constitution of a triple deck video tape recorder. In FIG. 2, a digital tuner 11 converts the RF signals of a VHF band (54~216 MHz corresponding to channels 2 through 13 or UHF band (470~890 MHz corresponding into channels 14 through 83 which are received through an antenna 10 to video signals of about 4 MHz. An output terminal of the digital tuner 11 is connected with a first video deck 12 which loads ½ inch VHS format video tapes, a second video deck 13 which loads 8 mm or 4 mm format video tapes, and a third video deck 14 of which loads ½ inch VHS format video tapes. An output terminal of the first video deck 12 is connected with a first switch 17 operated by control signals C1 from a MICOM 16 generated in response to manipulation of a key panel 15. An output terminal of the second video deck 13 is connected with a second switch 18 operated by control signals C2 from the MICOM 16. And, an output terminal of the third video deck 14 is connected with a third switch 19 operated by control signals C3 from the MICOM 16.

The first, second, and third video decks 12,13,14 are each connected to different synchronizing signal detecting parts 20,21,22 which detect synchronizing signals during operation of the first, second, and third video decks 12,13,14. The output terminals of the synchronizing signal detecting parts 20,21 22 are connected with a PIP control part 23 which provides the detected synchronizing signals to the PIP control part 23. The PIP control part 23 is connected to a PIP signal generating part 24 so as to apply control signals $A^1, B^1 C^1$, to the PIP signal generating part 24. The PIP signal generating part 24 is connected to a PIP signal selecting part 25 for selecting the outputs from the first, second, and third videos decks 12,13,14 which are received by the PIP signal selecting part 25. The PIP signal selecting part 25 selectively or compositively provides the outputs from the first, second, and third video decks 12,13,14, so that final video output signals are displayed on a monitor 27 through a video processing part 26.

Figure 3:
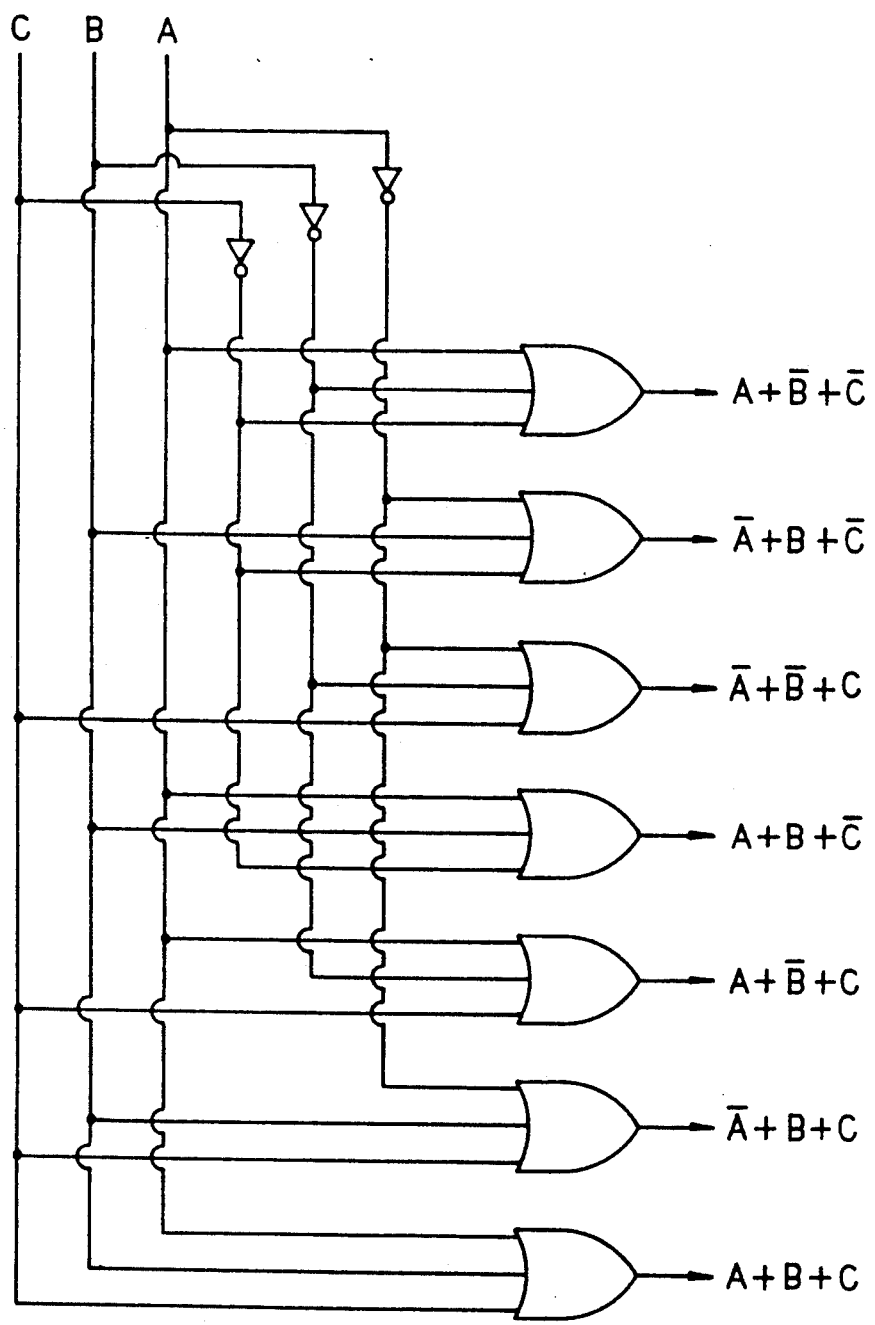
FIG. 3 is a detailed circuit diagram of a PIP signal generator as shown in FIG. 2.

FIG. 3 is a detailed circuit diagram of the PIP signal generating part 24 as shown in FIG. 2. In FIG. 3, the PIP signal generating part 24 includes 7 NOR gates having 3 input terminals and inverters, so that 7 different outputs can be provided according to the control signals A,B,C of the PIP control part 23.

In this case, the first to third video decks may be all ½ inch VHS format video decks for or two video decks of maybe VHS format whereas a third video deck is 8 mm or 4 mm format. Further, one video tape deck could be VHS format whereas of two video tape decks could be 8 mm or 4 mm format video decks, or one of the three video decks could be replaced with an digital audio tape deck.

The system of the present invention as above will now be described in detail.

First, in the case of recording from the first video deck 12 to the second video deck 13, if the user supplies the MICOM 16 with signals by manipulating the key panel 15, the MICOM 16 recognizes it and generates control signals C4,C5,C6 to put the first video deck 12 into a reproducing mode and the second video deck 13 into the recording mode, respectively. Then, the MICOM 16 turns off the third video deck 14 and generates only the control signal C1 in a high level so as to place the first switch 17 at a contact point (c) and to turn off the second and third switches 18,19.

If the first switch 17 is placed at the contact point (c), the video signals of the ½ inch video tape regenerated by the first video deck 12 are applied to the second video deck 13 through the contact point (c) through the first switch 17. Under this condition, a synchronizing signal detecting part 20 detects the synchronizing signals of the video signals reproduced by the first video deck 12 which are supplied to the PIP control part 23. In this case, the PIP control part 23 generates the part control signals $A^1, B^1, C^1$ and is supplied to the PIP signal generating part 24. Then, because of the constitution of the PIP signal generating part 24 as shown in FIG. 3, only the selecting signal A is placed in the high level to select only the output signals of the first video deck 12. The first and second video decks 12,14 under the reproducing and recording modes, respectively, if the user the switches first switch 17 to a contact point (e) by the control signal C1, the video signals of a video tape inserted into the first video deck 12 are recorded on the third video deck 14 and, at the same time, only the signals of the first video deck are displayed on the monitor 27 as described above. On the other hand, in the case of operating the second video deck 13 and the first video deck 12 under the reproducing and recording modes, respectively, the second video switch 18 connects to contact point (a) by a control signal C2 of the MICOM 16. Then, the video signals of 8 mm or 4 mm video tape in the second video deck 13 are recorded on the VHS video tape mounted on the first video deck 12. Under this condition, the synchronizing signal detecting part 21 is operated to apply the synchronizing signals to the PIP control generating part 23, so that the PIP control generating part 23 recognizes the synchronizing signals received from the synchronizing signal detecting part 21 to apply to the PIP signal generating part 24. As shown in FIG. 3, the PIP signal generating part 24 puts only the selecting signal B in the high level and applies it to the PIP signal selecting part 25, so that only the video signals of the 8 mm or 4 mm video tape are displayed on the monitor 27.

Further, in the case of operating the second video deck 12 and the third video deck 14 under the reproducing and recording modes respectively, the user places the second switch 18 at a contact point (f). Then, the video signals reproduced from the second video deck 13 are recorded on the third video deck 14 and simultaneously displayed on the monitor 27.

However, in the case of operating the third video deck 14 and the first video deck 12 under the reproducing and recording modes respectively, the user places the third switch 19 at a contact (b) by the control signal C3 of the MICOM 16. Then, the video signals of the third video deck are recorded on the video tape loaded into the first video deck 12. Under this condition, the synchronizing signal detecting part 22 provides the synchronizing signals to the PIP control part 23, and the PIP control part 23 applies the synchronizing signals to the PIP signal generating part 24 transferred from the synchronizing signal detecting part 22. Therefore, only the selecting signal C is put into the PIP signal selecting part 25 in a high level as shown in FIG. 3, and then, only the signals of the video tape loaded into the third video tape deck are displayed on the monitor 27.

Meanwhile, in the case of carrying out the recording onto the video tape loaded into the third video deck 14 from the video tape of the first video deck 12 for a main picture and using the video tape of the second video deck 13 for an auxiliary picture, the MICOM 16 puts the control signals C1,C2 in a low level. The video signals reproduced from the first video deck 12 are supplied through the first switch 17 to the terminal (e) of the third video deck 14, and the video signals reproduced from the second video deck 13 are supplied through the contact point (f) of the second switch 18 to the third video deck 14, so as to record on the video loaded into the deck third video. Under this condition, the first video tape deck provides the main picture, and the second video tape deck provides the auxiliary picture. If the synchronizing signal detecting parts 20,21 are operated to apply signals to the PIP control part 23, the PIP signal generating part 24 generates A+B signals to the PIP signal selecting part 25 to display the signals outputted from the PIP signal selecting part 25 on the monitor 27 through the video processing part 26. Under this condition, the signals of the first video tape forms the main picture and the signals of the second video tape form the auxiliary picture on sub-picture.

Meanwhile, in the case of operating the first video deck 12 and the third video deck 14, simultaneously in a reproducing mode and the second video deck 13 in a recording mode, the MICOM 16 puts the control signals C1,C2 in a high level and puts the control signal C3 in a low level. Then, the signals of the video tape loaded in the first video deck are supplied through the contact point ⓒ of the first switch 17 to a terminal ⓒ of the second video deck 13, and the signals of the loaded in the third video deck video tape are supplied through the contact point ⓓ of the third switch 19 to a terminal ⓓ of the second video deck 13, and also to display with the video signals from first video deck for the main picture and the video signals from third video deck for the auxiliary picture on the monitor 27.

On the other hand, in the case of operating the second video deck 13 and the third video deck 14 under the reproducing mode, and the first video deck 12 under the recording mode, the MICOM 16 is placed all the control signals C1, C2 in a high level and the control signal C3 in a low level, with the result that the signals of the video tapes loaded into the second and third video decks are supplied through the contact point ⓐ of the second switch 18 and the contact point ⓑ of the third switch 19 to the terminals ⓐ,ⓑ of the first video deck 12, respectively. Consequently, the signals applied to the first video deck 12 are recorded on the video tape therein to display the signals of the second video deck for the main picture and the signals of the third video deck for the auxiliary picture on the monitor 27.

If any two video decks are used for the reproducing mode and the other is used for the recording mode, the main and auxiliary picture signals can be obtained by the user's operating main picture and auxiliary picture function keys (not shown) of the key panel 15. That is, if the first and second video decks 12,13 are used for the reproducing mode and the third video deck 14 is used for recording mode, the main picture signals of the monitor 27 are the signals of the video tape loaded into the first video deck, and the auxiliary picture signals are the signals of the video tape loaded into the second video deck. Also, the main picture signals are the signals of the video tape loaded into the second video deck, and the auxiliary picture signals are the signals of the loaded into the first video deck video tape.

Meanwhile, in the case where the apparatus as shown in FIG. 2 is operated for reproducing, the respective video decks can selectively be operated by opening all the first to third switches 17,18,19 under the control of the MICOM 16 and selectively be applying the control signals C4,C5,C6 to the first, second, and third video decks 12,13,14 respectively. Further, if any two of the video decks are used for the simultaneously reproducing as described above, the main and auxiliary pictures can also be displayed on the monitor 27.

Further, in the case of reproducing from all three video decks simultaneously, if the signals are supplied to the MICOM 16 by manipulating the key panel 15, the MICOM 16 opens all the first to third switches 17~19 for controlling the control signals C1-C3 and the PIP signal generating part 24 generates the signals A+B+C in order to select all the first to third video decks. Then, three sets of the signals of the three video tapes are all displayed on the monitor 27, and even under this condition, the key panel 15 can be operated to display one main picture and two auxiliary pictures.

Further, the video tape recorder according to the present invention can record the respective channels selected by the digital tuner 11 and received through the television broadcasting, the antenna 10. The MICOM 16 puts the first, second, and third video decks 12,13,14 in the recording mode and opens all the first, second, and third switches 17,18,19 to record the broadcasting. In this case, the TV broadcasting is displayed on the monitor 27.

As another embodiment of the present invention, any one of 8 mm or 4 mm of the video deck and ½ inch VHS of the video decks is replaced with the digital audio tape or a compact disc disk so as to be used for an audio-video system for dubbing editions.

According to the present invention as described above, two VHS video decks and an 8 mm or 4 mm of video deck are integrated within a single video tape recorder system, and the main and the auxiliary pictures are formed so that the user can arbitrarily edit or display the pictures. Particularly, when editing a picture photographed by a camcorder, a certain beautiful or necessary scene can be inserted and the user can display a single picture with all the signals reproduced from three video decks on a single screen to mutually compare them or display a plurality of various pictures as a particular effect therefrom.

What is claimed is:

1. A triple deck recording and reproducing system, comprising:
    a digital tuner for processing received high frequency signals into video signals;
    a plurality of driving mechanism means for recording said video signals onto and reproducing recorded signals from magnetic recording media;
    switching means comprising a first switch for selectively supplying said recorded signals of a first one of said driving mechanism means to a second and a third one of said driving mechanism means, a second switch for selectively supplying said recorded signals of said second driving mechanism means to said first and said third driving mechanism means, and a third switch for selectively supplying said recorded signals of said third driving mechanism means to one of said first and said second driving mechanism means, said first to third switches being connected to output terminals of said driving mechanism means;
    synchronizing signal detecting means for detecting synchronizing signals contained in said recorded signals reproduced from said plurality of driving mechanism means;
    key inputting means provided with a plurality of function keys for enabling user control of said plurality of driving mechanism means and said switching means;
    control means for generating control signals to control said plurality of driving mechanism means and said switching means according to user operation of said key inputting means; and
    picture-in-picture signal generating means for controlling display of said recording signals based upon the existence or absence of the synchronizing signals.

2. A triple deck recording and reproducing system as claimed in claim 1, further comprised of said first and second driving mechanism means loading VHS format video tapes and said third driving mechanism means loading one of an 8 mm and 4 mm format video tape.

3. A triple deck recording and reproducing system as claimed in claim 1, further comprised of said first driving mechanism means simultaneously recording said recorded signals received from both said second and said third driving mechanism means.

4. A triple deck recording and reproducing system as claimed in claim 1, further comprised of said second driving mechanism means simultaneously recording said recorded signals from both of said first and third driving mechanism means.

5. A triple deck recording and reproducing system as claimed in claim 1, further comprised of said third driving mechanism means simultaneously recording said recorded signals from both said first and second driving mechanism means.

6. A triple deck recording and reproducing system as claimed in claim 1, further comprised of, in response to two of said plurality of driving mechanism means being operated in said reproducing mode, said recorded signals from one of said two of said plurality of driving mechanism means being used for a main picture and said recorded signals from another one of said two of said plurality of driving mechanism means being used for a sub-picture on a monitor.

7. A triple deck recording and reproducing system as claimed in claim 1, further comprised of, in response to all of said plurality of said driving mechanism means being operated in said reproducing mode, said recorded signals from one of said plurality of driving mechanism means being used for a main picture and said record signals from another two of said plurality of driving mechanism means being used for auxiliary pictures.

8. A triple tape deck recording and reproducing system, comprising:
   a common housing;
   a tuner for providing received video signals;
   a first video deck, disposed in said common housing, for recording said received video signals onto and reproducing first recorded signals from a first video tape cassette;
   a second video deck, disposed in said common housing, for recording said received video signals onto and reproducing first recorded signals from a second video tape cassette;
   a third video deck, disposed in said common housing, for recording said received video signals onto and reproducing third recorded signals from a third video tape cassette;
   first switch means for selectively supplying said first recorded signals to said second video deck and said third video deck;
   second switch means for selectively supplying said second recorded signals to said first video deck and said third video deck;
   third switch means for selectively supplying said third recorded signals to said first video deck and said second video deck;
   synchronizing signal detecting means for detecting synchronizing signals contained in said first recorded signals, said second recorded signals, and said third recorded signals;
   picture-in-picture controlling means for providing said first recorded signals, said second recorded signals, and said third recorded signals in response to detection of said synchronizing signals; and
   video signal processing means for combining said first recorded signals, said second recorded signals, and said third recorded signals provided by said picture-in-picture controlling means to generate main pictures and sub-pictures.

9. A triple tape deck recording and reproducing system as claimed in claim 8, further comprised of:
   said first video deck recording said second recorded signals provided by said second switching means and said third recorded signals provided by said third switching means onto said first video tape cassette;
   said second video deck recording said first recorded signals provided by said first switching means and said third recorded signals provided by said third switching means onto said second video tape cassette; and
   said third video deck recording said first recorded signals provided by said first switching means and said second recorded signals provided by said second switching means onto said third video tape cassette.

10. A triple tape deck recording and reproducing system as claimed in claim 8, further comprised of:
    said first video deck simultaneously recording said second recorded signals provided by said second switching means and said third recorded signals provided by said third switching means onto said first video tape cassette;
    said second video deck simultaneously recording said first recorded signals provided by said first switching means and said third recorded signals provided by said third switching means onto said second video tape cassette; and
    said third video deck simultaneously recording said first recorded signals provided by said first switching means and said second recorded signals provided by said second switching means onto said third video tape cassette.

11. A triple tape deck recording and reproducing system as claimed in claim 8, further comprised of said first video deck and said second video deck receiving VHS format video tapes and said third video deck receiving 8 mm format video tapes.

12. A triple tape deck recording and reproducing system as claimed in claim 8, further comprised of said first video deck and said second video deck receiving VHS format video tapes and said third video deck receiving 4 mm format video tapes.

13. A triple deck recording and reproducing system as claimed in claim 8, further comprised of said first video deck simultaneously recording said second recorded signals and said third recorded signals.

14. A triple deck recording and reproducing system as claimed in claim 8, further comprised of said second video deck simultaneously recording said first recorded signals and said third recorded signals.

15. A triple deck recording and reproducing system as claimed in claim 8, further comprised of said third video deck simultaneously recording said first recorded signals and said second recorded signals.

* * * * *

UNITED STATES PATENT AND TRADEMARK OFFICE
CERTIFICATE OF CORRECTION

PATENT NO.  : 5,239,420
DATED       : August 24, 1993
INVENTOR(S) : Seung Lyul Choi It is certified that error appears in the above-indentified patent and that said Letters Patent is hereby corrected as shown below:

Title page, item [75], Inventor: should read--Seung Lyul Choi--;
           item [57], Abstract: col. 2, line 3, change "tape recorder, when" to --tape recorder. When--;
Column 1, line 7, change "integrating" to --integration of--;
Column 1, line 16, change "=" to --or--;
Column 4, line 52, delete "the first switch 17 to";
Column 4, line 53, after "of the", insert --first switch 17 to the--;
Column 5, line 44, before "loaded", insert --bideo tape--; and
Column 5, line 45, delete "video tape".

Signed and Sealed this

Thirtieth Day of August, 1994

Attest:

Attesting Officer

BRUCE LEHMAN
Commissioner of Patents and Trademarks